United States Patent

[11] 3,542,480

| [72] | Inventor | Michael Alan Ford<br>Slough, Buckinghamshire, England |
|---|---|---|
| [21] | Appl. No. | 571,279 |
| [22] | Filed | Aug. 9, 1966 |
| [45] | Patented | Nov. 24, 1970 |
| [73] | Assignee | Perkin-Elmer Limited<br>Beaconsfield, Buckinghamshire, England<br>a British company |
| [32] | Priority | Aug. 11, 1965 |
| [33] | | Great Britain |
| [31] | | No. 34398/65 |

[54] SPECTROPHOTOMETERS
7 Claims, 12 Drawing Figs.

[52] U.S. Cl. .................................................. 356/205,
356/95, 356/97, 250/233
[51] Int. Cl. ....................................................... G01j 3/42;
G01n 21/22
[50] Field of Search .......................................... 88/14FB,
14SA; 250/43.5, 83.3IR; 356/51, 88—97, 205

[56] References Cited
UNITED STATES PATENTS
3,207,996  9/1965  Sundstrom ................... 88/14(FB)UX Primary Examiner—Ronald L. Wibert
Assistant Examiner—F. L. Evans
Attorney—Edward R. Hyde, Jr.

ABSTRACT: In a double-beam optical-testing instrument, for example, an infrared spectrophotometer, a first rotating beam splitter alternately presents the radiation from a single source to the sample and reference paths. A second rotating beam recombiner causes the radiation from the two paths (after passing through the sample and reference respectively) to be combined into a single, timed-sequence beam, falling on a single detector. The switching rates and relative phase of the first beam splitter and the second beam recombiner are chosen to cause the final beam reaching the detector to present four substantially equal stages. Specifically, the detector receives: 1) source radiation transmitted through the sample plus sample path reradiation; 2) source radiation transmitted through the reference plus reference path reradiation; 3) sample reradiation only (the source radiation being excluded from the sample path during this stage); and 4) reference reradiation only (again, no source radiation). The sample and reference reradiation in the detector output signal from this sequence is readily removed, since it has a zero signal contribution after synchronous rectification at the frequency corresponding to the entire four-stage cycle. Additionally, the sample transmitted radiation (free of sample reradiation) and the reference transmitted radiation (similarly, free of reference reradiation) are readily extracted separately, since they are in quadrature. A relatively simple synchronous demodulator can be used therefore to obtain a true ratio of sample transmission to reference transmission (both free of reradiation and similar background effects).

MICHAEL ALAN FORD
*Inventor*

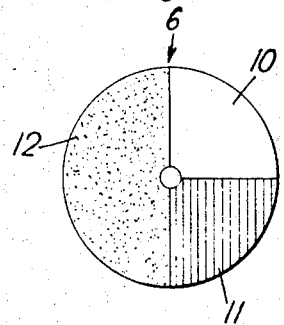
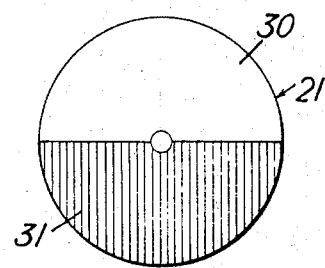
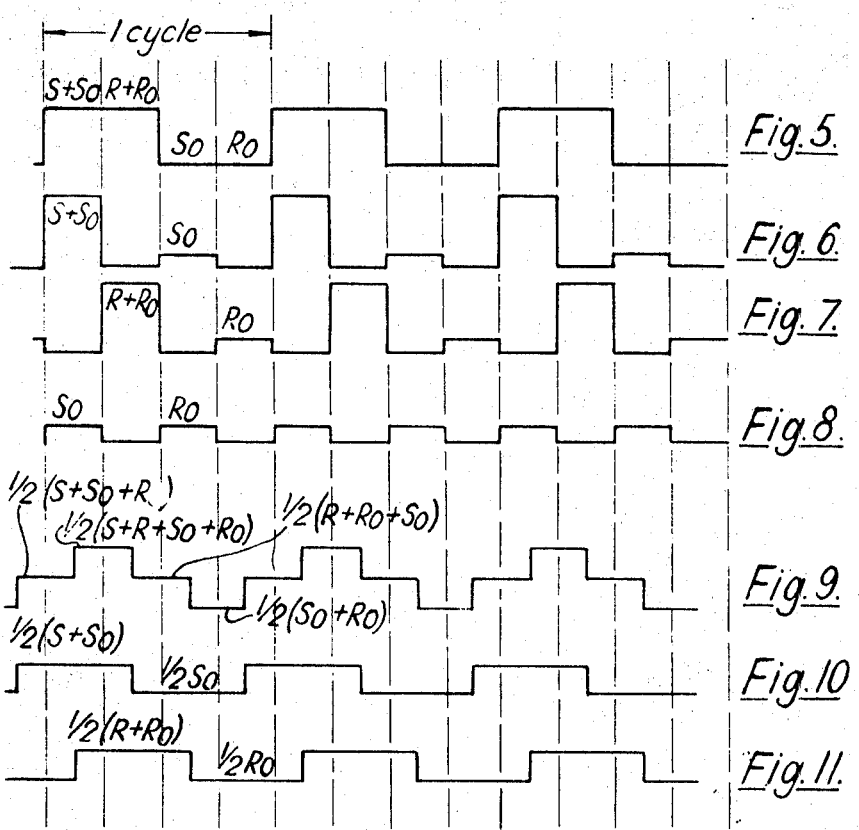
MICHAEL ALAN FORD
*Inventor*

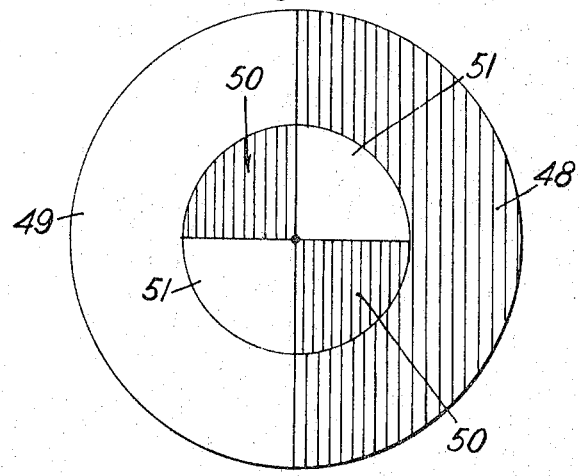
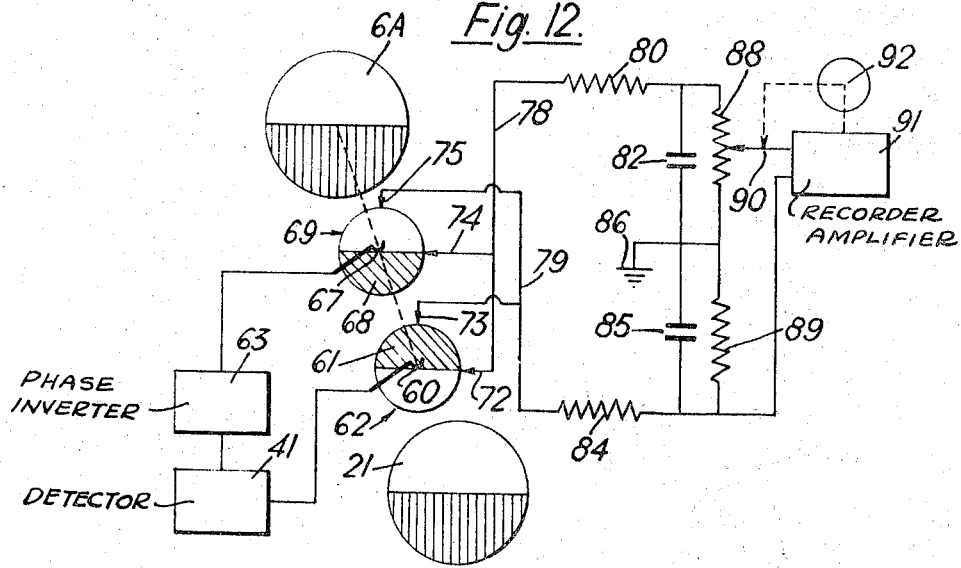

SPECTROPHOTOMETERS

This invention relates to double-beam spectrophotometers which have certain well known advantages over single-beam systems. In the simplest form of double-beam system, radiation from a source is split into two beams so as to pass along two separate paths which include the sample and reference materials respectively and the intensities of the two beams are compared by means of a detector. The signal from the detector, after amplification, is used to control a servomotor which drives a variable attenuator into the beam of radiation passing through the reference material so as to make the intensities of the two beams equal. The position of the attenuator is thus related to the required measurement, namely the relative absorption of the radiation by the sample and reference materials.

In a second type of double-beam system, with which the present invention is concerned, the signals obtained from the detector, corresponding to the intensities of the sample and reference beams respectively are compared directly, thus enabling the ratio of these intensities to be determined. This general result can be obtained in a number of different ways, depending on the sequence in which the radiation from the source is firstly split up to form the two separate beams and secondly the sequence in which the two beams are recombined and passed to the detector. For example, the detector may receive signals in the sequence, sample, blank, reference, blank which leads to an output at the fundamental frequency of beam switching proportional to radiation transmitted by the sample (S) minus radiation transmitted by the reference (R) and an output at double this frequency proportional to S plus R. By suitable electrical processing of these outputs at the two frequencies, the required ratio of sample to reference transmission is obtained.

An improvement on this was first proposed by Savitsky and Halford in the Review of Scientific Instruments Vol. 21, No. 3, pp. 203—212 for Mar. 1950. In this system the signals corresponding to sample and reference fall on the detector 90° out of phase, i.e. in quadrature. In such a system there is in effect only a single frequency signal and the required ratio $\frac{S}{R}$ is related to the phase of this signal and is obtained electrically. Such a single frequency system has a number of advantages, particularly for infrared spectrophotometers where the commonly used wide range detectors have a very limited frequency of response. As against this, however, such a system suffers from the disadvantage that the two beams, i.e. those passing through the sample and reference materials, have had to follow separate paths through the optical system of the spectrophotometer. This has led to considerable problems in the exact matching of the two beams at all wave lengths at which the spectrophotometer is used.

According to the present invention radiation from the paths of the two split beams is recombined in such a way as to fall on a detector in a sequence of four substantially equal stages during which the detector receives firstly radiation from the source from one path, secondly radiation from the source from the other path and then during the two remaining stages reradiation passing along the paths of the respective beams. The reradiation received by the detector during the third and fourth stages is that occurring from the various components along the two optical paths, primarily the sample and reference materials respectively. In practice it is not essential to include any reference material in the second beam, although, of course this beam still serves as a reference for comparison purposes. In the absence of the reference material the reradiation can arise, e.g. in infrared spectrophotometry, from the other components along the optical path. This method is applicable to double beam spectrophotometers of the second kind referred to above, i.e. in which the ratio between the intensities in the two beams is obtained directly from the variable signal from the detector.

Thus if the radiation passing through the sample from the source is designated as S and any reradiation originating from the sample itself as $S_o$ and corresponding radiation for the reference beam is designated as R and $R_o$, then the sequence of radiation passing to the monochromator and hence reaching the detector for each of the four stages of operation of the shutter is $S + S_o$, $R + R_o$, $S_o$ and $R_o$. Since the first two of these signals, which are those providing the required ratio of S:R, occupy adjacent quarters of a complete cycle they are in quadrature and thus lead to the same advantages as previously discussed; in addition the signals $S_o$ and $R_o$ give no component at the detector at the fundamental frequency of operation and therefore do not in any way effect the measurement of the required ratio.

In a double-beam spectrophotometer in accordance with the invention the essential feature resides in the cooperation between a beam-splitting device for directing a beam of radiation from a single source alternately into one path and another to define the sample and reference beams respectively and a beam-recombining device for alternately directing radiation, from the two paths on to a common detector, in the required sequence referred to above.

Preferably the beam-splitting device is a rotary member which includes a sequence of equal sectors of which one is transparent to allow radiation to pass through it along one path, another is reflective to reflect radiation along the other path and two adjacent sectors are substantially opaque to prevent radiation passing along either path. As a result of this, radiation passes along the two paths during each stage in the sequence in substantially the same manner as it is received by the detector. In other words, during the first stage, radiation from the source passes along one path and thence to the detector. During the second stage, radiation from the source passes along the second path and thence to the detector. During the third stage, substantially no radiation from the source passes along either path and the detector receives only reradiation from the first path. Finally during the last stage, no radiation from the source again passes along either path, but the detector receives reradiation from the second path. The absence of radiation from the source along either path during the last two stages materially reduces the heating effect on the sample and also on the reference material if such is provided.

As an alternative to this, however, the beam-splitting device may merely comprise alternate transparent and reflective surfaces so that radiation from the source is directed alternately into the two beams. During the first stage, radiation from the source is directed into the first path and from there to the detector via the correctly phased beam-recombining device. During the second stage, radiation from the source is directed into the second path, and the beam-recombining device during this stage is passing radiation from the second path to the detector. During the third stage, radiation from the source continues to be passed into the second path, but at that time the beam-recombining device, is directing reradiation from the first path to the detector. Finally, during the fourth stage radiation from the source passes along the first path and by this time the beam-recombining device is in a position to pass the reradiation along the second path to the detector. Thus, the sequence of radiation arriving at the detector is the same as previously described, but radiation from the source is passing along one or other of the two paths during the whole of the time.

As a result of the cooperation of the beam-splitting and beam-recombining devices, the output of the detector will include two components in quadrature representing respectively sample and reference beams, whereby the ratio of the two components may be extracted while the beams use the full aperture and at the same time effective cancellation of sample and reference reradiation is effected. Extracting means responsive to the detector output produce said ratio which is indicated by a display device adapted to respond to the changes thereof the extracting means will in general first separate out these two signal components, free of reradiation effects; and it is therefore possible to compare these components in manners other than determining their ratio so as to obtain other mathematical relationships between the sample and reference beam intensities.

A double-beam spectrophotometer operating in accordance with the invention will now be described in more detail, by way of example, with reference to the accompanying drawings, in which:

FIG. 2 shows a preferred form of beam-splitting device used in the optical system of FIG. 1 for producing the two beams;

FIG. 3 shows a device for recombining the two beams;

FIG. 4 shows a combined beam-splitting and beam-recombining device for use in a modification of the optical system of FIG. 1.

FIGS. 5 to 8 are waveform diagrams representing the signal from the detector from the two beams and from combinations of these;

FIGS. 9 to 11 are comparative waveforms for an alternative system; and

FIG. 12 shows extracting means suitable for use in the invention.

Figure 1:
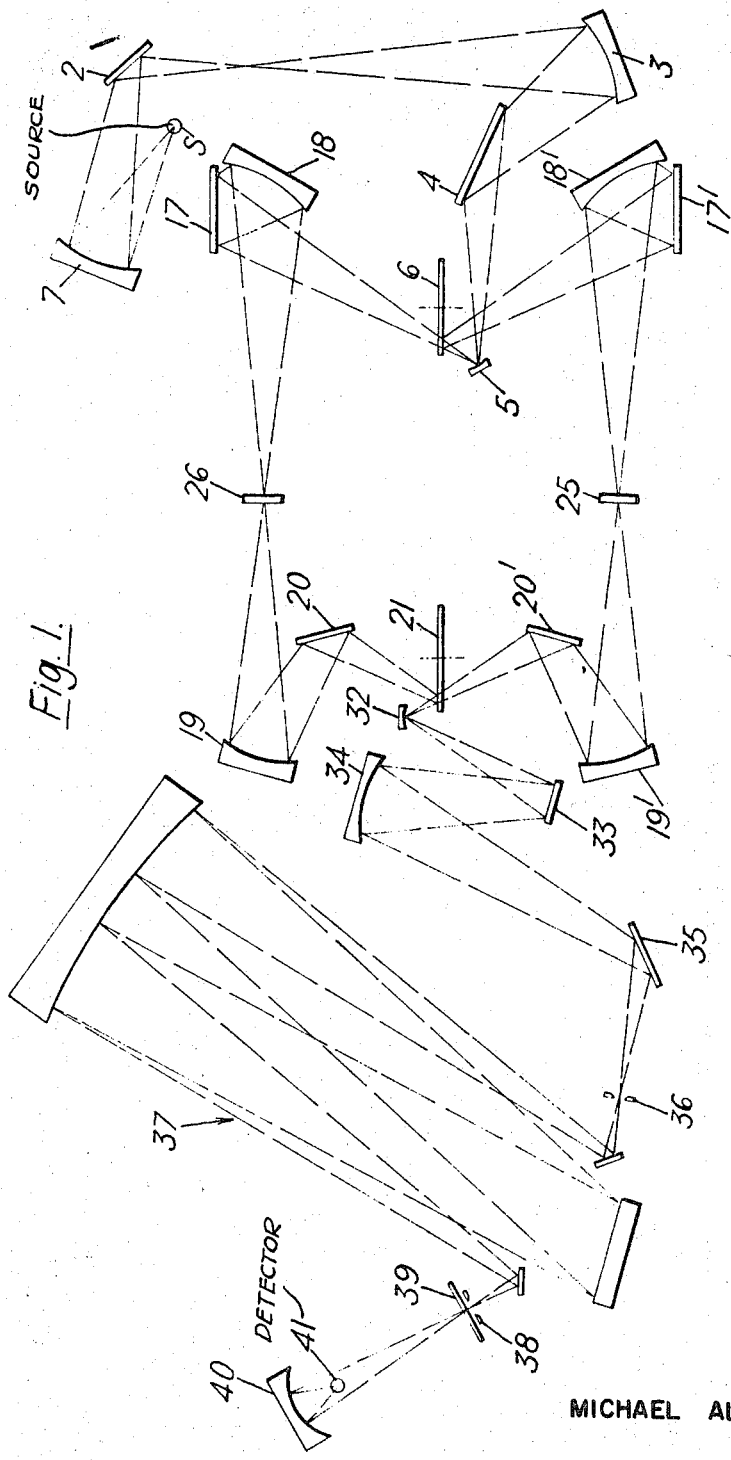
FIG. 1 shows the optical paths of the two beams through the instrument.

Turning first to FIG. 1, radiation from an infrared source 5 is focused by means of mirrors 1, 2, 3 and 4 and 5 onto a rotary beam-splitting device 6 shown to an enlarged scale in FIG. 2. As can be seen from this FIG. the device 6 has one clear quadrant 10, one reflecting quadrant 11, and two successive quadrants which are blank (i.e. opaque and absorbing) and neither allow the radiation to pass through nor significantly reflect it.

When the radiation from the mirror 5 falls on the clear quadrant 10, it passes straight through and thence by way of further mirrors 17, 18, 19 and 20 onto a rotary beam-recombining device 21. When the radiation from the mirror 5 falls on the reflective quadrant 11 of the device 6, it is reflected and passes by way of mirrors 17', 18', 19' and 20' also on to the device 21 from the opposite direction to the previous split beam. A sample whose characteristic absorption of radiation is to be measured is normally placed at 25 whilst a reference material may be placed in the other split beam at 26. When the rotary device 6 is in an angular position such that radiation from the mirror 5 falls on either of the quadrants 12, no radiation from the source passes along either of the two paths just described. During these two stages of the operating sequence, therefore, the only radiation falling on the device 21 is reradiation passing along the paths of the two beams and arising from various components along the paths and including the sample 25 and the reference material 26 if this is included.

The beam-recombining device 21 is illustrated in FIG. 3 and, as will be seen, it consists of a clear semicircle 30 and a reflecting semicircle 31, so that radiation from the two beams is passed alternately along the remainder of the optical path. This device 21 is driven at twice the frequency of the beam-splitting device 6 so that one of the two semicircles is operative substantially simultaneously with each of the four quadrants of the shutter 6. Accordingly, during the first of the four stages of operation of the beam-splitting device 6, when radiation passes through the sample 25 it is allowed to pass through the device 21 together with any sample path reradiation, and along the remainder of the optical path; in the next stage when radiation passes along the reference beam, this is reflected by the device 21 and passes along the remainder of the optical path, together with any reference path reradiation, and for the last two stages when reradiation alone passes along the two paths respectively, this also is passed on by the device 21 and according to whether the clear semicircle 30 or the reflective semicircle 31 is operative sample path and reference path reradiation respectively will be passed on to the detector.

Radiation from the device 21 passes on to a mirror 32 and then by way of further mirrors 33, 34 and 35 to the entrance slit 36 of a monochromator indicated generally as 37. After leaving the exit slit 38 of the monochromator, the radiation passes through filters 39 and is directed by a mirror 40 onto a detector 41. The detector is typically of the thermal response type such, for example, as a thermocouple or Golay cell as described in U.S. Pat. No. 2,557,096. The monochromator 37 although illustrated as a grating monochromator of the Ebert type may take any standard form and may even be replaced by a suitable filter or filters. The beam-splitting device 6 is preferably driven at a frequency of approximately 13 cycles per second and the recombining device 21 must be driven at exactly double this frequency, i.e. approximately 26 cycles per second.

Broadly speaking, the requirement is that the speed of alternation of the beam-recombining device should be double that of the beam-splitting device. Whether the two devices conform to FIGS. 2 and 3, respectively, or both to FIG. 3, this can be achieved by suitable choice of the relative speeds of rotation and of the angular extent of the respective sectors such as by the use of a recombining device divided into alternate clear and reflecting quadrants, in which case the speed of rotation would need to be same as that of the device 6. Another possibility is illustrated in FIG. 4 in which the two devices are combined in a single element. The outer portion of this element defines the beam-splitting device and comprises a reflecting sector 48 and a transparent sector 49. The inner portion defines the beam-recombining device and comprises two opposite reflecting sectors 50 and two opposite transparent sectors 51. Since the sectors 50 and 51 have only half the angular spread of the sectors 48 and 49, the beam-recombining portion alternates at double the frequency of the beam-splitting portion, as is required. In order to make use of a combined device of this nature, it is necessary to adapt the optical paths shown in FIG. 1, for example by shortening the portions of the paths including the samples and reference materials so that the portions of the paths which would pass through the devices 6 and 21 are brought closely adjacent one another so as to pass through the inner and outer portions of the combined device.

By means of the optical systems described, the detector 41 will receive radiation in a sequence $S + S_o$, $R + R_o$, $S_o$ and $R_o$, using the same terminology as previously. The effect of these is illustrated in FIGS. 5 to 8.

FIG. 5 shows the total signal obtained from the detector 41 with no sample or reference. FIG. 6 shows the signal obtained from the sample beam alone. FIG. 7 shows the signal obtained from the reference beam alone. Finally FIG. 8 shows the signal obtained from the sample beam alone for zero transmission through the sample. The advantages obtained are best understood from a comparison with the results of FIGS. 9 to 11 which illustrate the effect obtained with the system as described by Savitsky and Halford, referred to above. With this system the respective signals are in quadrature but since they each have a span of a half cycle there is an overlap of a quarter of a cycle. Referring to FIGS. 5 to 8 it will be seen as already mentioned that the signals $S_o$ and $R_o$ give no component at the fundamental frequency even though a component is given at double this frequency. These FIGS. also make it clear that the two signals corresponding to the sample and the reference are in quadrature as already mentioned.

Comparing the results obtained from FIGS. 5 to 8 with those of FIGS. 9 to 11 it will be seen that in the system in accordance with the invention there is a signal of amplitude 1 and mark/space ratio 1:3 whereas in the prior art system of FIGS. 9 to 11 there is an amplitude of ½ and mark/space ratio 1:1. Taking the first Fourier component of these signals at the fundamental frequency $f$ it can be shown that for the system in accordance with the invention the amplitude is 2 greater than for the original Savitsky-Halford system. Since the amplitude of any spurious noise should be the same in the two cases, then the new system in accordance with the invention will give an improvement of 2 in signal-to-noise as compared with the previous system.

As previously mentioned, the output of the detector 41 requires further processing in order to give an indication of the ratio of the intensities of the two beams. FIG. 12 shows a demodulator system suitable for this purpose. As shown in this FIG., the amplified output from the detector 41 is supplied firstly to a slipring 60 connected to a segment 61 of a commutator 62. In addition the amplified output is supplied to a phase invertor 63 which, in its turn, supplies a slipring 67 connected to a segment 68 of a commutator 69. The two commutators 62 and 69 are connected to turn together with a beam-splitting device equivalent to the device 6. This is shown as 6A since it does not correspond to the showing of FIG. 2 in that it does not include any masking quadrants 12. The commutators are insulated from one another and are mounted so that the conducting segments are in opposition as shown. The beam-recombining device 21 is included in this figure merely to show the mechanical phasing at one particular instant. As previously described it is driven at twice the speed of the device 6A by means of a drive not shown.

Pairs of pickup brushes 72 and 73 and 74 and 75 cooperate respectively with the commutators 62 and 69 and one brush of each pair is connected to the corresponding brush of the other pair. The purpose of the commutators 62 and 69 and their associated brushes is to provide synchronous rectification with a 90° phase shift, i.e., rectification and separation of the two signals in quadrature which appear in the output from the detector 41. As a result of this, the separated rectified reference signal appears on a conductor 78 and the separated rectified sample signal appears on a conductor 79.

The conductor 78 is connected to an integrator comprising a resistor 80 and a capacitor 82. Similarly the conductor 79 is connected to an integrator comprising a resistor 84 and a capacitor 85. The capacitors 82 and 85 have a common earth point 86. A potentiometer 88 is is taken to one input terminal of a recorder amplifier 91 and the lower end of the resistor 89 is taken to the other input terminal of this recorder. The output of the recorder 91 controls a servomotor 92 which drives the slider 90 until the balance point is reached, the position of the slider 90 then denoting the ratio of the integrated signals. The slider is at the top end of the potentiometer 88 when the sample has a 100 percent transmission and at the lower end for 0 percent transmission.

This description of the demodulator system is included only for sake of completeness as a simplified form of a typical system which may be used for the purpose.

A system in accordance with the invention has the following advantages in addition to those already described. Each of the two split beams utilizes the full aperture of the spectrophotometer in turn, thus following identical optical paths through the monochromator thereby avoiding serious matching problems. Partly as a result of this the system is far less critical in optical alinement requirements than other systems. In addition it is relatively easy to limit the illumination of the sample by the source to one quarter of the time in each cycle thereby greatly reducing the heating of the sample (e.g. by using a splitting chopper of the type shown at 6 in FIG. 2).

The invention thus provides a technique and apparatus for double-beam photometric measurement in which the full aperture width of both the sample and reference beams and paths are used, thereby eliminating errors from optical "matching" problems (i.e., nonsymmetry). In addition a greater signal-to-noise ratio is obtained than previously; and, in at least the preferred embodiment, the undesired heating effects on the sample (and reference) are minimized by illumination thereof only during that stage of each cyclical period for which a transmission measurement is actually being made. Although a preferred form (and a somewhat simpler form) of chopper geometry for both the splitter and recombiner have been disclosed, the above explains the the necessary relationships so as to teach how different choppers may be used in an equivalent manner. Similarly other changes may be made without departing from the teaching of the invention. In particular, many different types of signal processing schemes other than that specifically illustrated in FIG. 12 may be used. The invention therefore is not limited to any of the details of the disclosed specific embodiment, but rather is defined by the scope of the appended claims.

I claim:
1. A double-beam optical-testing instrument comprising:
   a source of radiation;
   a beam-splitting device for directing a radiation beam from said source alternately at a first rate in two different paths to define sample and reference beams respectively;
   means for positioning a sample in said sample beam;
   a beam-recombining device for alternately directing at a second rate, twice as great as said first rate, radiation from said two different paths, including said sample and reference beams at full aperture width along a common path;
   a radiation detector in said common path;
   said beam-splitting and said beam-recombining devices being of such construction and in such phase relationship that said detector will receive radiation along said common path in a sequence of four substantially equal and separate stages, during two adjacent stages of which the detector receives radiation from the source from one of said different paths, and then radiation from the source from the other path, and during the two remaining adjacent stages, successively, only reradiation passing along each of said two paths, said detector therefore producing an output comprising two separate major components in quadrature representing the intensities of said sample and reference beams respectively, plus other secondary components representing reradiation from each of said two different paths; and
   means for extracting from said detector output a signal free from said secondary components.
   whereby an indication of the relative intensities of said entire width of said sample and reference beams is obtained, free from any reradiation effects, thereby yielding accurate data as to an optical effect on said sample beam caused by a sample traversed thereby.

2. A double-beam optical-testing instrument according to claim 1, in which:
   said extracting means comprises means for determining the ratio between said two major components, free from said secondary components,
   whereby a direct indication is obtained of the relative transmission of a sample which may be present in said sample beam.

3. A double-beam optical-testing instrument according to claim 1 in which:
   said beam-splitting device comprises a rotary chopper member comprising at least one series of four substantially equal sectors;
   one of said sectors is transparent so as to pass said source radiation beam therethrough to one of said two different paths;
   An adjacent second one of said sectors is reflective so as to reflect said source radiation beam to the other of said different paths; and
   the two remaining of said four sectors are substantially opaque so as to prevent source radiation from passing along either of said different paths,
   whereby each of said two different paths receives source radiation only one quarter of the time, thereby minimizing heating of any elements in said paths.

4. A double-beam optical-testing instrument according to claim 1 in which:
   said beam-splitting device comprises a rotary chopper member having a first number of alternately transparent and reflective chopping sectors, each having substantially the same first angular extent;
   said beam-recombining device comprises a rotary recombiner member having a second number of alternately transparent and reflective recombining sectors, each having substantially the same second angular extent; and
   said first and said second numbers and the rotational speed of said rotary chopper member and said rotary recombiner member being such that twice as many recombining sectors as chopper sectors pass a stationary point per unit time.

5. A double-beam optical-testing instrument according to claim 1, in which:
   said beam-splitting device and said beam-recombining device comprise radially spaced first and second zones, respectively, of a common rotary member;
   each said zone being divided into a series of substantially equal annularly arranged, alternately transparent and reflective portions; and
   the annular angular extent of each beam-splitting portion of said first zone being twice that of each beam-combining portion of second zone,
   whereby twice as many alternate transparent and reflective recombining portions of said second zone as splitting portions of said first zone pass a given stationary radial line for each rotation of said common rotary member.

6. A method for testing an optical property of a sample material by a double-beam technique, comprising:
   generating a source radiation beam;
   alternately directing said source radiation beam along two different paths so as to form two alternating beams;
   placing a sample material in one of said different paths so as to intercept only one of said alternating beams;
   recombining and directing both of said alternating beams onto a radiation detector to cause said detector to receive in a continuous sequence of four substantially equal and separate stages: firstly, one of said alternating beams, secondly, the other of said alternating beams, and during each of the two remaining stages background reradiation solely from each of said two different paths exclusive of any radiation contained in said alternating beams; and
   generating a signal containing information concerning said optical property of said sample material, and extracting said information from said signal free from the effects of background reradiation.

7. A directing according to claim 6, comprising directing said source radiation beam along each of said two different paths only during each of said four sequential stages that said detector is actually receiving the corresponding alternating beam.